United States Patent [19]
Yoshizawa et al.

[11] 3,989,926
[45] Nov. 2, 1976

[54] DEVICE FOR PREVENTING OVERHEATING OF ELECTROPHOTOGRAPHIC FIXING DEVICE

[75] Inventors: Masataka Yoshizawa, Iwatsuki; Yasuhiro Fujita, Omiya, both of Japan

[73] Assignee: Rank Xerox, Ltd., London, England

[22] Filed: Jan. 22, 1975

[21] Appl. No.: 543,110

Related U.S. Application Data

[63] Continuation of Ser. No. 354,059, April 4, 1973, abandoned.

[30] Foreign Application Priority Data
June 19, 1972  Japan................................ 47-60452

[52] U.S. Cl. ............................... 219/358; 219/216; 219/388; 219/512; 337/123; 337/386
[51] Int. Cl.² .................... H05B 1/02; H01H 61/04; H01H 37/46
[58] Field of Search ........... 219/512, 358, 388, 216, 219/354; 337/123, 125, 126, 139, 140, 382, 386, 393

[56] References Cited
UNITED STATES PATENTS

| | | | |
|---|---|---|---|
| 1,594,158 | 7/1926 | Else | 219/512 X |
| 1,610,552 | 12/1926 | James | 337/123 |
| 1,671,300 | 5/1928 | MacDonald et al. | 219/388 |
| 2,102,487 | 12/1937 | Schwarz | 337/140 X |
| 2,509,747 | 5/1950 | Seiter | 219/512 UX |
| 3,243,579 | 3/1966 | Sussin | 219/512 X |
| 3,253,124 | 5/1966 | Brohl | 219/512 X |
| 3,283,126 | 11/1966 | Velvel | 219/216 X |
| 3,525,967 | 8/1970 | Stauber | 337/386 X |
| 3,569,667 | 3/1971 | Ryswick | 219/512 X |
| 3,649,808 | 3/1972 | Garbe | 219/216 |

*Primary Examiner*—A. Bartis

[57] ABSTRACT

A thermal fixing device for a xerographic reproducing apparatus includes a thin planar resistance heating element having a low thermal mass and a high coefficient of thermal expansion. The heating element is supported in such manner that one end thereof is free to move linearly under thermal expansion to activate a heater displacement detector comprising a pivotally mounted lever arm having a right angle configuration. One end of the lever arm is received in an opening in the heating element and the other end form a contact of a normally open switch which is adapted to be closed by pivoting of the arm due to expansion of the heating element. Closure of the switch activates a power controller to interrupt the power supply to the heating element.

3 Claims, 3 Drawing Figures

DEVICE FOR PREVENTING OVERHEATING OF ELECTROPHOTOGRAPHIC FIXING DEVICE

This is a continuation of application Ser. No. 354,059, filed Apr. 4, 1973, now abandoned.

BACKGROUND OF THE INVENTION

This invention relates to a device or control for preventing overheating of a thermal fusing apparatus utilized in a xerographic reproducing machine for heating and fixing resinous powder images formed on a suitable base or substrate.

Generally, several types of systems for performing such a function as heating resinous powder images are known, among which there are two typical or commonly employed systems. One such system comprises the passing of a substrate between two heating rolls coated with an abhesive material, for example, tetraflourethylene or the like, so as to cause the discreet portions of the resinous powder to coalesce into a tacky state and thereby adhere to the substrate and upon cooling thereof become substantially permanently bonded thereto. The abhesive material performs the function of releasing the tacky material to the substrate.

Another commonly employed system comprises a heating wire which is coiled around a quartz tube wherein a substrate having powder images electrostatically adhered thereto are passed in thermal communication with the coiled wire in such a manner that the heat therefrom causes the resinous powder to coalesce and become tacky.

In the case of the former system, imperfect or no fusing may result unless sufficient pressure is applied between the two rolls which are coated with a non-binding or abhesive agent, such as tetraflourethylene, so that a large pressure or force needs to be applied to the rolls thereby necessitating that the rolls possess a high degree of rigidity to withstand large pressures. Therefore, the heat capacity of such rolls is necessarily increased resulting in a longer time being required for such rolls to be elevated to a temperature sufficiently high to properly fuse the powder images.

In the case of the fuser of the latter type wherein thermal energy is provided by means of a wire coiled around a quartz tube, there is a possibility of fire due to the fact that the wire heating element becomes red hot during fusing. Such a system, therefore, presents problems with respect to operational safety requiring safety devices be provided to prevent the possibility of such dangers.

In an attempt to overcome such problems there has been developed a so-called planar or flat heating type fusing system wherein there is provided a relatively thin planar heating element or unit made of a material with high electrical resistance, for example, nickel-chrome foil. This system is advantageous over the other systems discussed above, in that, it has a greater efficiency because for the same amount of power being supplied a greater surface area is available and faster temperature rise is obtained.

Various types of controls are known for maintaining planar type heating elements at an optimum range of temperatures, such systems are based on the same principle of operation which is the measuring of the operating temperature of the heating element or its environment and the comparing of that temperature with a reference temperature to thereby generate an error or difference signal which is utilized to vary the power supply to the heating element by either causing it to be raised or lowered. Characteristically, such controls require an excess of power for the purpose of accommodating this difference. Since planar heating elements of the type herein contemplated are extremely thin and extremely small in heat capacity, the excess power hereinabove referred to can elevate the temperature of the heating element far in excess of the desired temperature, in a very short period of time, for example, a few seconds.

BRIEF SUMMARY OF THE INVENTION

In view of the foregoing, it is a principle object of this invention to provide an improved fusing apparatus for use in a xerographic reproducing machine.

It is a more particular object of this invention to provide an improved temperature control for a fusing device employed in an electrostatic reproducing apparatus.

Another object of this invention is to provide a new and improved electrostatic reproducing apparatus incorporating a novel fusing device.

Still another object of the invention is to provide a new and improved thermal fuser for use in a xerographic reproducing apparatus which fuser comprises a radiant heating element whose movement due to thermal expansion actuates a switch controller to interrupt the supply of power to the heating element.

Briefly, the above-cited objects are accomplished by the provision of a fuser incorporating a radiant heating element which is mounted such that thermal expansion thereof causes interaction between the heating element and a heater switch controller such that the heater switch controller is actuated when the heating element exceeds a predetermined temperature resulting in the opening of a heater switch. Such actuation results in the interruption of the supply of power to the heating element thereby preventing damage due to overheating.

DETAILED DESCRIPTION OF THE DRAWINGS

DETAILED DESCRIPTION OF THE INVENTION

Figure 1:
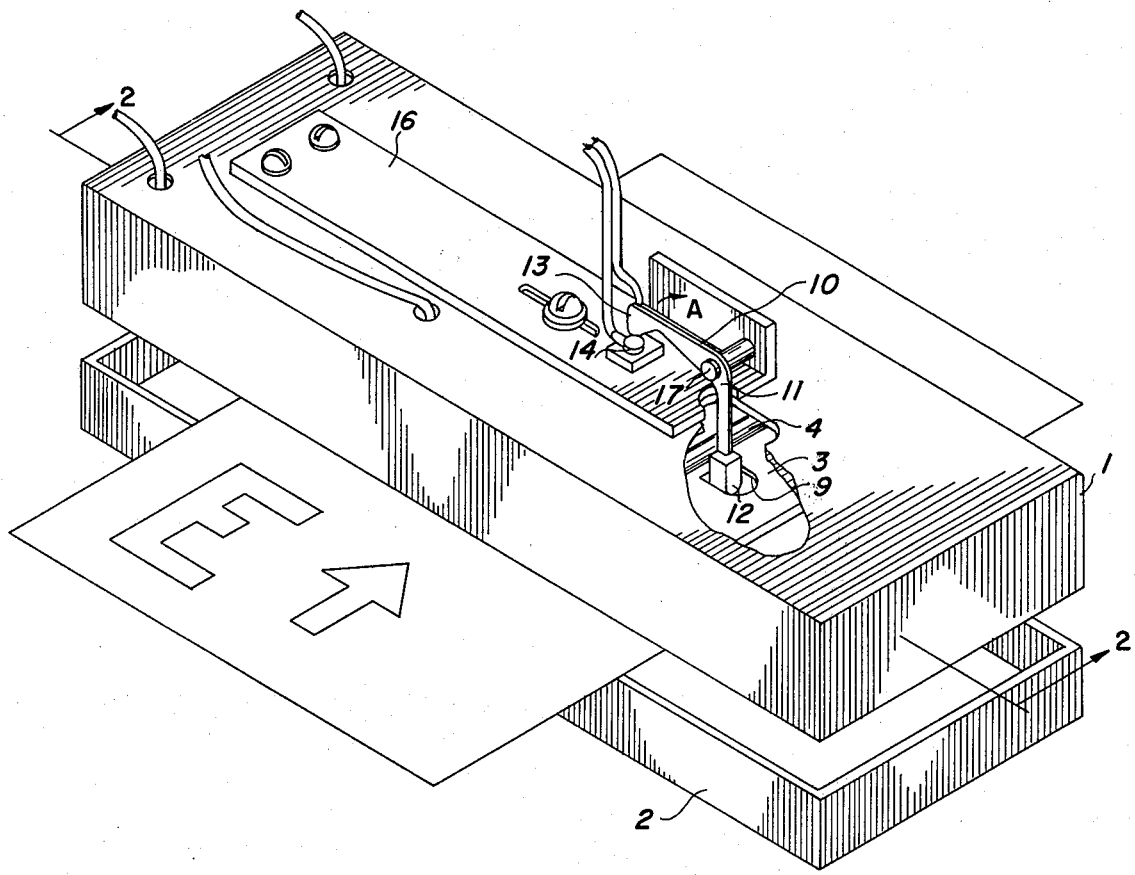
FIG. 1 is a perspective view of a thermal fusing device for use in a xerographic reproducing apparatus to affix powder images to a substrate such as plain paper.

For a general understanding of the operation of a xerographic reproducing apparatus in which the fusing device is incorporated, reference may be had to U.S. Pat. No. 3,612,820 wherein there is disclosed the various system components of such an apparatus.

In the apparatus illustrated in the aforementioned patent, a light image of a document to be reproduced is projected onto the sensitized surface of a xerographic plate to form an electrostatic latent image thereon. Thereafter, the latent image is developed with an oppositely charged developing material to form a xerographic powder image corresponding to the latent image on the plate surface. The powder image is then electrostatically transferred to a support surface to which it is fused whereby the powder is caused to permanently adhere to the support surface, which surface usually comprises plain paper.

In such an apparatus, an original to be copied is placed upon a transparent support platen fixedly arranged in an illumination assembly and image rays are projected by means of an optical system for exposing the photosensitive surface of a xerographic plate often in the form of a drum.

The drum is mounted upon the frame of the machine and is adapted to rotate in one direction at a constant rate. During this movement of the drum, it passes a charging station where a uniform electrostatic charge is applied to the surface thereof. Next at an exposure station, exposure of the drum surface to the light image discharges the xerographic plate in the areas struck by light, whereby there remains on the surface a latent electrostatic image in image configuration corresponding to the light image projected from the original on the supporting platen. As the drum surface continues its movement, the electrostatic image passes through a developing station in which there is positioned a developer assembly. The developer assembly delivers developing material to the upper part of the drum whereat the material is directed to cascade over the drum surface in order to provide development of the electrostatic image. As the developing material is cascaded over the drum surface toner particles in the development material are deposited on the surface to form powder images.

The developed electrostatic image is transported by the drum to a transfer station whereat a sheet of copy paper is moved at a speed in synchronism with the moving belt in order to accomplish transfer of the developed image. There is provided at this station a sheet transport mechanism adapted to transport sheets of paper from a paper handling mechanism to the developed image on the drum at the transfer station.

After the sheet is stripped from the drum, it is conveyed to a fuser apparatus whereat the developed and transferred xerographic powder image on the sheet material is permanently affixed thereto as will be described more fully hereinafter. After fusing, the finished copy is discharged from the apparatus by a belt conveyor to a suitable point for collection externally of the apparatus. Suitable drive means are arranged to drive the drum in conjunction with timed exposure of an original to be copied, to effect conveying and cascading of toner material to separate and feed sheets of paper and to transport same across the transfer station and to convey the sheet of paper through the fuser apparatus in timed sequence to produce copies of the original.

Figure 2:
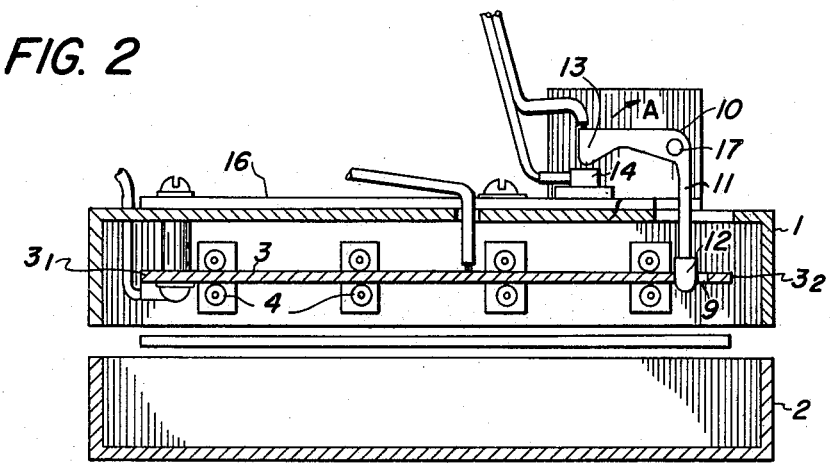
FIG. 2 is a cross-sectional view of the thermal fusing device illustrated in FIG. 1 and taken on the line II-II thereof.

Referring now to the drawings, particularly FIGS. 1 and 2, reference numerals 1 and 2 refer to upper and lower housing members, respectively, of a heat fixing unit. Mounted in the upper housing 1 is a thin plane heating unit 3 made of a material with relatively high electric resistivity and a large coefficient of thermal expansion, such as nickel-chrome or nickel-chrome iron alloy, with an end $3_1$ of said unit being fixed. The other end $3_2$ of the heating unit 3 is free to expand or contract in accordance with the change of temperature. Reference character 4 denotes one of a plurality of rollers adapted to support the plane heating unit 3 in a manner to accommodate the aforementioned expansion and contraction of the heating unit.

Figure 3:
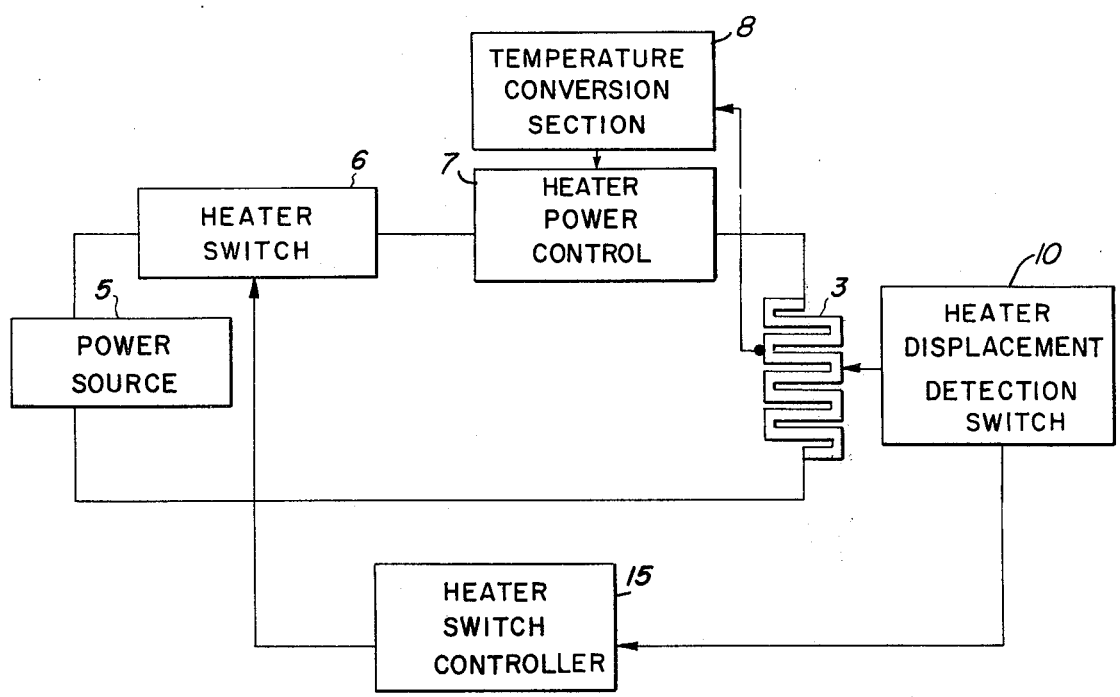
FIG. 3 illustrates a control circuit for the fusing device illustrated in FIG. 1.

Power is supplied to the heating unit 3 from a power source 5 (FIG. 3) through heater switch 6 and a power control section 7. Under normal conditions, the temperature of the heating unit 3 is incessantly measured in a temperature electrical current conversion section 8 and the measured value is fed back to the power control section 7 to thereby maintain the setting temperature.

The free end $3_2$ of the heating unit 3 has a hole 9 formed therein in which is fitted an insulated portion 12 of an L-shaped lever 11 which is pivotally supported at its central portion, which constitutes, in the shown embodiment, a mechanical displacement detecting means in the form of a heater displacement detection switch 10. A constant force is applied to the L-shaped lever 11 that urges the lever to turn or pivot in the direction of arrow A, such force being provided by a suitable means, not shown. The other end 13 of the lever 11 constitutes a normally open switch which cooperates with a terminal 14 disposed therebelow. When the switch 14 is closed, a shut-off signal is transmitted to a heater switch controller section 15, as described later, whereupon the heater switch 6 is operated to shut off the supply of power to the plane heating element or unit 3.

Operation of the control for the fusing device disclosed takes place when trouble arises in the temperature control system such that the input from the power source 5 is applied directly to the plane heating unit 3. When this occurs the temperature increase of the heating unit 3 is abnormal, taking place in a few seconds, and hence resulting in an excessive expansion of the heating unit part As a result, the free end $3_2$ of the heating unit 3 will be moved to the right as viewed in FIG. 2 thereby pushing the L-shaped lever 11 to turn counterclockwise until the other end 13 of the lever 11 comes into contact with the terminal 14 whereupon a shut-off signal is immediately transmitted to the heater switch controller 15 to actuate the heater switch 6 to disconnect power to the plane heating unit 3.

Although in the above-described embodiment an L-shaped lever 11 is adapted as the mechanical displacement detecting means 10, such means may be embodied by using the other suitable detecting elements such as strain gauge, photoelectric element, magnetic switch or the like. Also, the reference point for comparing elongation of the free end $3_2$ of the plane heating unit 3 may be provided either at a part thermally insulated from the fixing unit or on a support member 16 made of a material having somewhat smaller coefficient of expansion than the plane heating unit 3, as in the above discussed embodiment. In this case, the supporting shaft 17 of the L-shaped lever 11 is providing such reference point.

As described above, the overheat preventing device according to the present invention, comprises means for detecting mechanical displacement caused by thermal expansion of the plane heating unit, means for shutting off the supply of power to the heating unit when the value detected by the detecting means exceeds a previously set value so that any abnormal rise in temperature in the plane heating unit due to some trouble in the temperature control system can be immediately checked.

Those skilled in the art will recognize that the foregoing illustrative embodiment of the invention represents but a single embodiment and various modifications can be made to the apparatus without departing from the spirit of the inventive concept. Accordingly, the scope of protection sought by letters patent is to be defined solely by the appended claims.

What is claimed is:

1. In a xerographic reproducing apparatus, the improvement comprising:
    a thermal fixing device including a thermally expansible member supported thereby, said thermally expansible member having a high coefficient of thermal expansion, said thermally expansible member being relatively thin whereby it comprises a low thermal mass, the thermal expansion of which is quite rapid;
    means supporting one end of said thermally expansible member in a fixed position while supporting the other end thereof so as to allow linear movement thereof;
    means for supplying power to said thermal fixing device;
    a displacement detector and a normally open switch which cooperate to generate a shut-off signal, said detector being actuated by physical contacting thereof by said thermally expansible member in response to said linear movement to thereby close said normally open switch;
    means responsive to said shut-off signal to interrupt the power supply to said thermal fixing device;
    said displacement detector comprising a pivotably mounted lever arm and said thermal fixing device comprising a resistance heating element having an opening receiving said lever arm, said lever arm having a generally right angle configuration and being supported for pivotable movement intermediate the extremities thereof, one of said extremities being received in said opening in said resistance heating element and the other of said extremities forming one part of said normally open switch which is adapted to be closed through pivoting of said lever arm.

2. Apparatus according to claim 1, including means for regulating the power input to said resistance heating element to thereby maintain the operating temperature thereof substantially constant.

3. In a xerographic reproducing apparatus, the improvement comprising:
    a thermal fixing device including a planar resistance heating element having a high coefficient of thermal expansion, said planar resistance heating element being relatively thin whereby it comprises a low thermal mass, the thermal expansion of which is quite rapid;
    means supporting one end of said planar resistance heating element in a fixed position while supporting the other end thereof so as to allow linear movement thereof;
    means for supplying power to said resistance heating element;
    a heater displacement detector and a normally open switch which cooperate to generate a shut-off signal, said detector being actuated by physical contacting thereof by said planar resistance heating element in response to said linear movement to thereby close said normally open switch; and
    means responsive to said shut-off signal to interrupt the power supply to said resistance heating element;
    means for regulating power input to said resistance heating element to thereby maintain the operating temperature thereof substantially constant;
    said heater displacement detector comprising a pivotably mounted lever arm and said resistance heating element having an opening receiving said lever arm;
    said lever arm having a generally right angle configuration and being supported for pivotable movement intermediate the extremities thereof, one of said extremities being received in said opening and said resistance heating element and the other of said extremities forming one part of said normally open switch which is adapted to be closed through pivoting of said lever arm.

* * * * *